United States Patent [19]
Caldara et al.

[11] Patent Number: 5,822,540
[45] Date of Patent: Oct. 13, 1998

[54] METHOD AND APPARATUS FOR DISCARDING FRAMES IN A COMMUNICATIONS DEVICE

[75] Inventors: Stephen A. Caldara, Sudbury; Stephen A. Hauser, Burlington; Thomas A. Manning, Northboro; David N. Peck, Marlborough, all of Mass.

[73] Assignees: Fujitsu Network Communications, Inc., Richardson, Tex.; Fujitsu Limited, Kawasaki, Japan

[21] Appl. No.: 683,791

[22] Filed: Jul. 18, 1996

Related U.S. Application Data

[60] Provisional application No. 60/001,498 Jul. 19, 1995.
[51] Int. Cl.[6] .................................................. G06F 13/00
[52] U.S. Cl. ............................... 395/200.66; 395/200.6; 395/200.65
[58] Field of Search ........................... 395/200.66, 200.6, 395/200.65

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,084,228 | 4/1978 | Dufond et al. | 364/200 |
| 4,240,143 | 12/1980 | Bessemer et al. | 364/200 |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,769,810 | 9/1988 | Eckberg, Jr. et al. | 370/60 |
| 4,769,811 | 9/1988 | Eckberg, Jr. et al. | 370/60 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |

(List continued on next page.)

FOREIGN PATENT DOCUMENTS 484943  3/1992  Japan .

OTHER PUBLICATIONS

*Head of Line Arbitration in ATM Switches with Input–Output Buffering and Backpressure Control.* By Hosein F. Badran and H. T. Mouftah, Globecom '91, pp. 0347–0351.

An Ascom Timeplex White Paper, *Meeting Critical Requirements with Scalable Enterprise Networking Solutions Based on a Unified ATM Foundation,* pp. 1–12, Apr. 1994 Apr. 1995?.

Douglas H. Hunt, *ATM Traffic Management–Another Perspective,* Business Communications Reiew, Jul. 1994.

Richard Bubenik et al., *Leaf Initiated Join Extensions,* Technical Committee, Signalling Subworking Group, ATM Forum/94–0325R1, Jul. 1, 1994. Dated Jul. 18–21, 1994.

Douglas H. Hunt et al., *Flow Controlled Virtual Connections Proposal for ATM Traffic Management (Revision R2)* Traffic Management Subworking Group, ATM Forum/94–0632R2, Aug. 1994. Dated Sep. 1994.

(List continued on next page.)

*Primary Examiner*—Mehmet B. Geckil
*Attorney, Agent, or Firm*—Weingarten, Schurgin, Gagnebin & Hayes LLP

[57] ABSTRACT

The invention comprises a method and apparatus for discarding frames in a communications device. In accordance with the method of the invention, a plurality of cells are received representing a plurality of frames wherein each cell comprises a data portion and a header portion including a cell loss priority indicator. At least some of the cells are stored in a buffer. It is determined if the number of cells in the buffer exceeds a first threshold when a first cell including an end of file marker is received. A series of cells received between the first cell and a second cell are discarded if the first threshold was exceeded in the determining step and if the cell loss priority indicator for a cell in the series of cells is set to a first state. The second cell comprises a cell including an end of file marker.

19 Claims, 2 Drawing Sheets

FIG. 2

U.S. PATENT DOCUMENTS

| | | | |
|---|---|---|---|
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/85.13 |
| 4,899,333 | 2/1990 | Roediger | 370/60 |
| 4,920,531 | 4/1990 | Isone et al. | 370/60 |
| 4,922,503 | 5/1990 | Leone | 370/85.13 |
| 4,933,938 | 6/1990 | Sheehy | 370/85.13 |
| 4,942,574 | 7/1990 | Zalle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Mahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et a.l. | 370/94.1 |
| 5,198,808 | 3/1993 | Kudo | 340/825.8 |
| 5,199,072 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Proctor et al. | 370/94 |
| 5,305,311 | 4/1994 | Lyles | 370/60 |
| 5,309,431 | 5/1994 | Tominaga et al. | 370/60 |
| 5,309,438 | 5/1994 | Wakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Faulk, Jr. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,361,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |

| Patent Number | Date | Name | Class |
|---|---|---|---|
| 5,412,648 | 5/1995 | Fan | 370/60 |
| 5,414,703 | 5/1995 | Sakaue et al. | 370/60 |
| 5,418,942 | 5/1995 | Krawchuk et al. | 395/600 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,426,635 | 6/1995 | Mitra et al. | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudson | 379/58 |
| 5,450,406 | 9/1995 | Esaki et al. | 370/60.1 |
| 5,452,296 | 9/1995 | Shimizu | 370/60.1 |
| 5,454,299 | 10/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,620 | 10/1995 | Sriram | 370/60 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Munter | 370/58.2 |
| 5,479,401 | 12/1995 | Bitz et al. | 370/60.1 |
| 5,479,402 | 12/1995 | Hara et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Katuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,511,070 | 4/1996 | Lyles | 370/60 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,689 | 5/1996 | Kim | 370/17 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrne et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,265 | 9/1996 | Kakuma et al. | 370/60 |
| 5,555,324 | 9/1996 | Kakuma et al. | 370/58.2 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Iomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |

OTHER PUBLICATIONS

Flavio Bonomi et al., *The Rate–Based Flow Control Framework for the Available Bit Rate ATM Service,* IEEE Network, Mar./Apr. 1995, pp. 25–39.

R. Jain, *Myths About Congestion Management in High Speed Networks,* Internetworking Research and Experience, vol. 3, 101–113 (1992).

Douglas H. Hunt et al., *Credit–Based FCVC Proposal for ATM Traffic Management (Revision R1),* ATM Forum Technical Committee Traffic Management Subworking Group, ATM Forum/94–0168R1, Apr. 28, 1994, Dated: May 10–13, 1994.

Douglas H. Hunt et al., *Action Item Status for Credit–Based FCVC Proposal,* ATM Forum Technical Committee Traffic Management Subworking Group, ATM Forum/94–0439, Apr. 28, 1994. Dated: May 10–13, 1994.

Timothy P. Donahue et al., *Arguments in Favor of Continuing Phase 1 as the Initial ATM Forum P–NNI Routing Protocol Implementation,* ATM Forum Technical Committee, ATM Forum/94–0460, Apr. 28, 1994. Dated: May 10–13, 1994.

Richard Bubenick et al., *Leaf Initiated Join Extensions,* Technical Committee, Signalling Subworking Group, ATM Forum/94–0325, Apr. 28, 1994. Dated: May 10–13, 1994 (large font).

Rob Coltun et al., *PRP: A P–NNI Routing Protocol Proposal*, ATM Forum Technical Committee, ATM Forum/94–0492, Apr. 28, 1994. Dated: May 10–13, 1994.

Richard Bubenik et al., *Leaf Initiated Join Extensions*, ATM Forum Technical Committee, Signalling Subworking, Group, ATM Forum 94–0325, Apr. 28, 1994. Dated: May 10–13, 1994 (small font).

Richard Bubenik et al., *Requirements For Phase 2 Signaling Protocol*, ATM Forum Technical Committee, Signalling Subworking Group, ATM Forum 94–1078, Jan. 1, 1994. Dated: Jan. 17–20, 1994.

H.T. Kung and K. Chang, *Receiver–Oriented Adaptive Buffer Allocation in Credit–Based Flow Control for ATM Networks*, Proceedings of INFOCOM '95, Apr. 2–6, 1995, pp. 1–14.

H.T. Kung et al., *Credit–Based Flow Control for ATM Networks: Credit Update Protocol, Adaptive Credit Allocation, and Statistical Multiplexins*, Proceedings of ACM SIGCOM M'94 Symposium on Communications Architectures, Protocols and Applications, Aug. 31–Sep. 2, 1994, pp. 1–14.

SITA, ATM RFP: C–Overall Technical Requirements, Sep. 1994.

5,822,540

METHOD AND APPARATUS FOR DISCARDING FRAMES IN A COMMUNICATIONS DEVICE

RELATED APPLICATIONS

This application claims the benefit of U.S. provisional application Ser. No. 60/001,498, filed Jul. 19, 1995.

TECHNICAL FIELD OF THE INVENTION

This invention relates generally to telecommunications and more specifically to a method and apparatus for discarding frames in a communications device.

BACKGROUND OF THE INVENTION

Communication networks employing asynchronous transfer mode (ATM) cells for communication often are interfaced to devices employing various communications protocols. Because a number of existing communications networks employ communications protocols other than ATM, ATM communications networks are often interfaced to existing communications networks. Examples of communications networks include the telephone network, ISDN networks, frame relay networks, ethernet networks, and/or token ring networks. Some existing communication networks that are interfaced to ATM communication networks use frames of information to communicate. When frames are transported through an ATM communications network, the frames are typically broken up into a series of ATM cells wherein the end of a frame is indicated by information in the header of the ATM cell.

To relieve congestion in an ATM communications network, it is sometimes desirable to discard ATM cells at a switching node in the network due to congestion in either that switching node or in the communications network in general. Discarding cells that are pieces of frames traveling through the ATM communications network, however, can cause bandwidth to be used inefficiently. If a single ATM cell that is a piece of a frame comprised of a larger number of ATM cells is discarded, then the entire frame of ATM cells will need to be resent through the communications network. If other ATM cells in this frame are allowed to pass through the network after a cell of the frame has been discarded, then the bandwidth used to transmit the non-discarded cells through the ATM communications network will essentially be wasted. Discarding frames in a congested switching node or network may also be problematic as certain frames may be more important than other frames.

SUMMARY OF THE INVENTION

The invention comprises a method and apparatus for discarding frames in a communications network using a series of cells for communication. The invention allows frames to be assigned different priorities such that frames having different priorities may be discarded at different levels of congestion. One aspect of the invention is a method for discarding frames in a communications device. A plurality of cells are received representing a plurality of frames wherein each cell comprises a data portion and a header portion including a cell loss priority indicator. At least some of the cells are stored in a buffer. When a first cell including an end of frame marker is received, it is determined if the number of cells in the buffer exceeds a first threshold. If the first threshold was exceeded, then a series of cells received between the first cell and a second cell is discarded if the cell loss priority indicator for a cell in that series of cells is set to a first state. The second cell comprises a cell including an end of frame marker.

The invention has several important technical advantages. The invention allows more efficient use of bandwidth in an ATM communications network as an entire frame comprising a series of cells is discarded when congestion occurs, rather than only discarding a portion of the frame. In addition, even if the network becomes congested during the transmission of a frame, the cells in that frame will remain undiscarded unless an overrun condition is detected or the buffer pool limit is exceeded. The invention allows cells of a frame to be marked with multiple priority levels using header information of the ATM cells. This feature of the invention allows frames to be discarded at varying levels of congestion depending upon their priority. A lower priority frame will be discarded at a lower level of congestion. The invention may therefore increase the throughput of high priority frames.

With prioritized frame discard, frames may be marked as high priority when they use bandwidth below the committed information rate of the frame based communications network and as low priority when they use bandwidth above the committed information rate of the frame based communications network. An ATM communications network employing the present invention may then first discard frames that were sent above the committed information rate, providing a fairer distribution of bandwidth among users of the frame based communications network. Also, prioritized frame discarding may be used as an input filter in a communications network where the end stations are not flow controlled.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
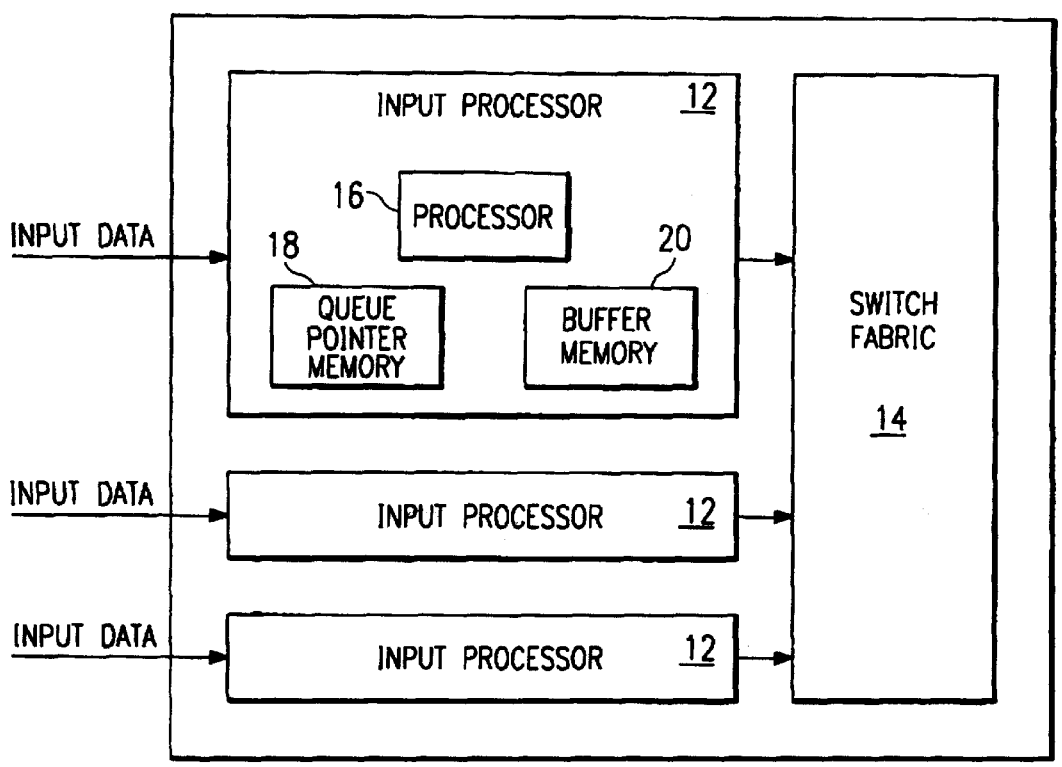
FIG. 1 illustrates a block diagram of a communications device constructed in accordance with the teachings of the invention.
Figure 2:
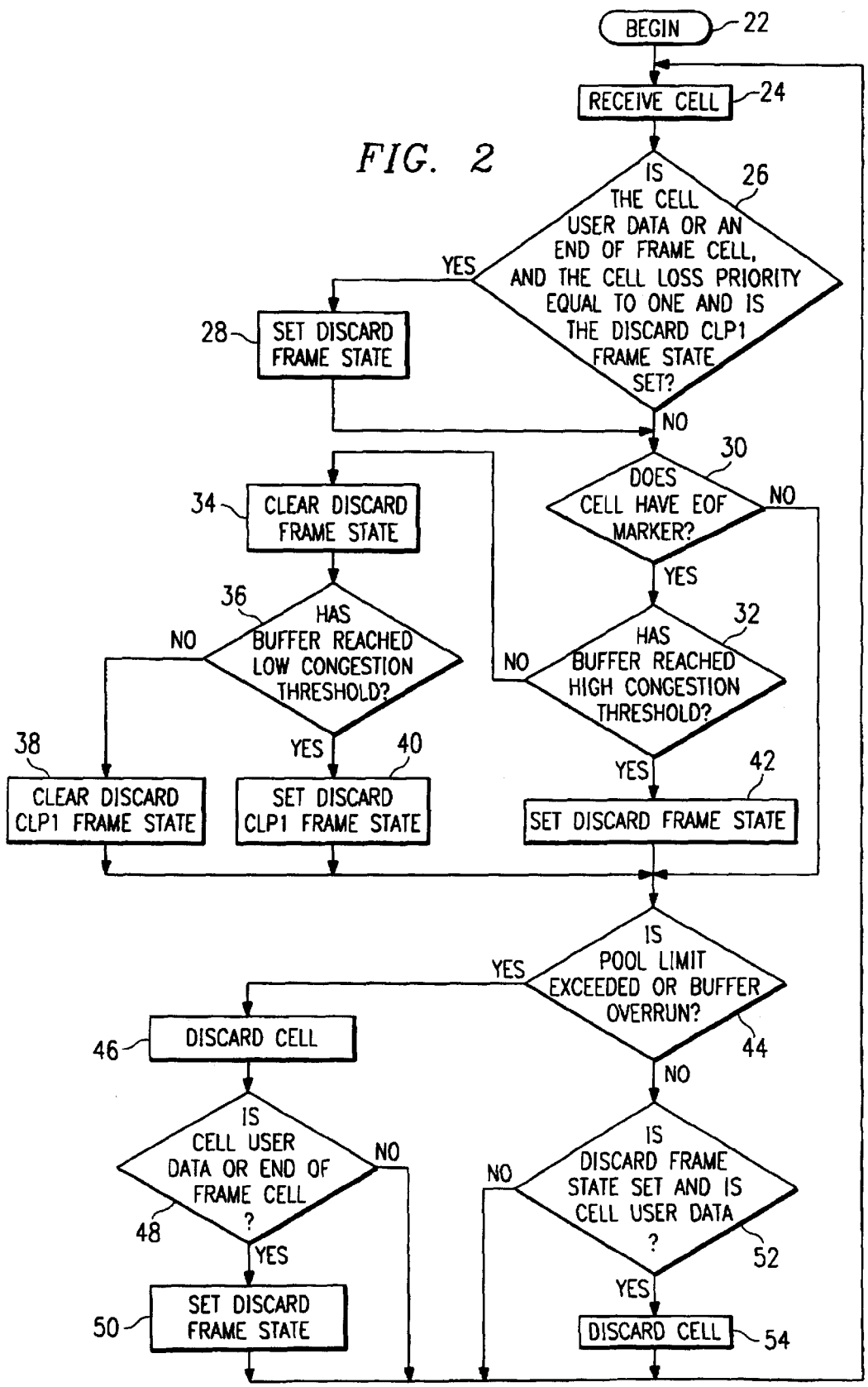
FIG. 2 illustrates a flow chart describing the steps of discarding frames in accordance with the invention.

The preferred embodiment of the present invention and its advantages are best understood by referring to FIGS. 1 through 2 of the drawings, like numerals being used for like and corresponding parts of the various drawings.

FIG. 1 illustrates a communications device 10 constructed in accordance with the teachings of the invention. In this embodiment, communications device 10 comprises a switching node in an ATM communications network. Communications device 10 could be any type of communications device in a communications network employing a series of cells to pass frames of information through the communications network.

Communications device 10 comprises a series of input processors 12 coupled to a switch fabric 14. Each input processor 12 is connected to one or more sources of input data. Input processor 12 processes the input data, discards cells as necessary, and passes non-discarded cells to switch fabric 14. Input processor 12 may also convert varying types of data into a series of ATM cells.

Input processor 12 further comprises processor 16, queue pointers 18, and buffer memory 20. Input processor 12 comprises an application specific integrated circuit (ASIC) but could also be any type of electronic circuitry operable to perform the functions described below.

Processor 16 controls the discarding of cells in communications device 10. Cells received by input processor 12 that are not discarded by processor 16 are stored in queues in buffer memory 20. In this example, each virtual connection is associated with its own queue in buffer memory 20. Pointers stored in queue pointer memory 18 are used to keep track of the front and back of each queue in buffer memory 20. Each queue associated with a virtual connection may also be referred to as a buffer. Input processor 16 determines a maximum size for a queue associated with a specific virtual connection and stored in buffer memory 20. In addition, processor 16 may assign a buffer associated with a virtual connection to a pool of buffers associated with other virtual connections. Thus, processor 16 may also place a limit on the maximum number of cells that may be contained in a buffer pool besides limiting the number of cells that may be contained in an individual buffer.

Processor 16 also maintains counters reflecting the number of cells in a particular buffer associated with a virtual connection. If multiple buffers are associated with a virtual connection, then processor 16 may maintain a counter for each of the multiple buffers. Processor 16 uses the buffer counters to monitor congestion and discard frames if congestion exceeds certain thresholds.

In this embodiment, processor 16 maintains two levels of priority for frames and two congestion thresholds corresponding to those levels of priority. Processor 16 could maintain a greater or a lesser number of priority levels without departing from the scope of the invention. In this example, lower priority frames are discarded after a lower threshold of congestion is encountered while higher priority frames are discarded after a higher level of congestion is encountered.

This embodiment uses the cell loss priority bit in the header of ATM cells making up a frame to determine the priority of a frame. When the cell loss priority bit has a value of zero, then the frame is considered to be a high priority frame. When the cell loss priority bit is set to one, then the frame is considered to be a low priority frame. This embodiment uses the cell loss priority bit of the first cell of the frame to make a determination of whether a frame should be discarded. Ordinarily, the cell loss priority bit of each cell in a frame will have the same value. Other header information could be used to indicate priority without departing from the scope of the invention.

To make efficient use of bandwidth, processor 16 checks for congestion at frame boundaries. If a cell has an end of frame indicator, then processor 16 checks to determine whether either the low congestion threshold or high congestion threshold has been exceeded. If the low congestion threshold has been exceeded, then a state variable is set to indicate that any subsequent frames having low priority (cell loss priority bit equals one) are to be discarded. If the high congestion threshold has been exceeded, then a state variable is set to indicate that any subsequent frame should be discarded. In either case, the end of frame cell is not discarded. If neither congestion threshold was exceeded at a frame boundary, then the state variables are set to a non-discard state so that the subsequent frame will not be discarded.

In this embodiment, only user data cells, which are not end of frame cells, are discarded. Due to their importance to system operation, other cells, such as OAM cells, are not discarded unless the pool space has been exceeded or an overrun condition is present as described below. Processor 16 determines whether or not a cell contains user data or other data using the payload type indicator for the cell. The payload type indicator appears in the header of the ATM cell.

If the check at the end of a frame reveals that the high congestion threshold has been exceeded, then all of the cells in the subsequent frame are discarded, with the exception of the end of frame cell, and processor 16 again determines the state of congestion at the end of the discarded frame. If it was determined at the end of a frame that the low congestion threshold has been exceeded and the cell loss priority bit of the first cell of the next frame is set to one, then all of the cells in that frame are discarded and processor 16 will again check the level of congestion at the end of the discarded frame.

Processor 16 may also discard portions of frames when congestion has become so critical that either a buffer overrun has occurred or the number of cells in a buffer pool has reached the pool limit associated with that buffer pool.

Processor 16 causes cells in discarded frames to be discarded before they are placed in buffer memory 20. This aspect of the invention allows easier manipulation of the queue pointers stored in queue pointer memory 18 as rearranging of the queues is unnecessary.

More detailed operation of the invention can best be understood by referring to FIG. 2. FIG. 2 illustrates a flow chart describing the method by which input processor 12 of FIG. 1 discards frames. The method illustrated in FIG. 2 employs two state variables to determine whether or not to discard frames. The first state variable, discard frame state, is set when the level of congestion has reached a point at which all frames should be discarded and cleared otherwise. The second state variable, discard CLP1 frame state, is set when the level of congestion is high enough to discard frames having a cell loss priority equal to one (low priority). This variable is cleared otherwise.

The method begins in step 22 with initialization. Initially, the state variables are cleared in step 22. In step 24, a cell is received. Then, in step 26 it is determined if the cell is user data or an end of frame cell, if the cell loss priority is equal to one, and if the discard CLP1 frame state is set. A cell is considered to be user data when its payload type indicator equals 0 or 2. A cell is considered to be an end of frame cell when its payload type indicator is equal to 1 or 3. The payload type indicator appears in the header of the ATM cell. If all of the conditions are met in step 26, then the current frame is to be discarded as it has a cell loss priority equal to 1, the level of congestion is sufficiently high to discard frames of that type, and the frame contains user data. Thus, the discard frame state variable is set in step 28. Following step 28 or if all the conditions were not met in step 26, the procedure continues in step 30. Note that step 26 depends upon the state of the discard CLP1 frame state variable which is only altered when processing an end of frame cell at the frame boundary.

In step 30, it is determined whether the cell has an end of frame marker. If not, then the process continues in step 44. If so, then a frame boundary has been reached and the congestion in the network should be examined. Accordingly, the process continues in step 32 where it is determined whether the buffer has reached the high congestion threshold. If so, then the discard frame state variable is set in step 42 and the procedure continues in step 44. If not, then the discard frame state variable is cleared in step 34 in case the variable was set for the previous frame. Then, in step 36, it is determined whether the buffer has reached the low congestion threshold. If not, then the discard CLP1 frame state variable is cleared in step 38 in case it had been set for the previous frame. If the low congestion threshold has been reached, then the discard CLP1 frame state variable is set in step 40.

Next, in step 44, it is determined whether the pool limit has been exceeded or a buffer overrun condition has occurred. In this embodiment, several virtual connections may share a buffer pool. If the limit of this buffer pool is exceeded, then the current cell should be discarded immediately in step 46 as there is no place to put the cell. Similarly, if a buffer overrun has occurred, the cell should also be discarded in step 46 even though such a discard may occur in the middle of a frame. After step 46, the process continues in step 48 where it is determined if the cell is user data or an end of frame cell. If not, then the procedure returns to step 24 to receive the next cell. If so, then the discard frame state is set in step 50. Setting the discard frame state in step 50 will cause the rest of the frame from which the cell was discarded in step 46 to also be discarded. Because one cell of the frame was already discarded, the rest should also be discarded to avoid wasting bandwidth. As above, the end of frame cell will still be sent if the buffer overrun condition or pool limit overrun condition is no longer present when the end of frame cell is received.

Returning to step 44 if neither condition was met, then the procedure continues in step 52. In step 52 it is determined whether the discard frame state variable is set and whether the current cell contains user data. If not, then the procedure returns to step 24 to process the next cell. If so, then the current cell is discarded in step 54 and the procedure then loops back to step 24.

The process in FIG. 2 thus checks for congestion at frame boundaries as each end of frame cell is received. If the level of congestion exceeds the predetermined threshold appropriate for the following frame, then the cells of the following frame with the exception of the end of frame cell are discarded. This process thus utilizes network bandwidth more efficiently and allows prioritized discarding of frames.

Although the present invention has been described in detail, it should be understood that various changes, substitutions, and alterations can be made hereto without departing from the spirit and scope of the invention as defined by the appended claims.

What is claimed is:

1. A method for discarding frames in a communications device, comprising:
   receiving a plurality of cells representing a plurality of frames, each cell comprising a data portion and a header portion, the header portion including a cell loss priority indicator;
   storing at least some of the cells in a buffer;
   determining if the number of cells in the buffer exceeds a first threshold when a first cell having an end of frame marker corresponding to a first frame is received; and
   discarding a series of cells received between the first cell and a second cell if the first threshold was exceeded and if the cell loss priority indicator for a cell in the series of cells is set to a first state, wherein the second cell has an end of frame marker corresponding to a subsequent frame in relation to the first frame.
   wherein each of the plurality of frames is assigned one of plural, different priorities and wherein the frames are discarded at different levels of congestion within the buffer, based upon the different priorities.

2. The method of claim 1, wherein the discarded series of cells include each cell in the subsequent frame received after the first frame with the exception of the second cell.

3. The method of claim 1, further comprises:
   determining if the number of cells in the buffer exceeds a second threshold when the first cell is received;
   discarding a series of cells received between the first cell and the second cell if the second threshold was exceeded.

4. The method of claim 3, further comprises:
   discarding a cell if the number of cells in the buffer exceeds an overrun threshold.

5. The method of claim 4, wherein the buffer is a member of a buffer pool, the method further comprising:
   discarding a cell if the number of cells in the buffer pool exceeds a buffer pool limit.

6. The method of claim 5, further comprising a step of:
   discarding all cells corresponding to a frame that is associated with the cell exceeding the buffer pool limit.

7. The method of claim 1, further comprising:
   discarding a cell if the number of cells in the buffer exceeds an overrun threshold.

8. The method of claim 1, wherein the buffer is a member of a buffer pool, the method further comprising:
   discarding a cell if the number of cells in the buffer pool exceeds a buffer pool limit.

9. The method of claim 1, wherein the cells comprise asynchronous transfer mode cells.

10. A communications device, comprising:
    a switch fabric; and
    an input processor coupled to the switch fabric and operable to
       receive a plurality of cells representing a plurality of frames, each cell comprising a data portion and a header portion, the header portion including a cell loss priority indicator, the input processor having a buffer operable to store at least some of the cells, the input processor operable to generate a first discard signal if the number of cells in the buffer exceeds a first threshold when a first cell having an end of file marker corresponding to a first frame is received, and the input processor operable to discard a series of cells received between the first cell and a second cell in response to generation of the first discard signal and if the cell loss priority indicator for a cell in the series of cells between the first cell and the second cell is set to a first state, wherein the second cell has an end of frame marker corresponding to a subsequent frame in relation to the first frame.

11. The communications device of claim 10, wherein the input processor comprises an application specific integrated circuit.

12. The communications device of claim 10, wherein the cells comprise asynchronous transfer mode cells.

13. The communications device of claim 10, wherein the discarded series of cells include each cell in the subsequent frame received after the first frame with the exception of the second cell.

14. The communications device of claim 10, wherein the input processor is operable to generate a second discard signal if the number of cells in the buffer exceeds a second threshold when the first cell is received; the input processor operable to discard a series of cells received between the first cell and the second cell in response to generation of the second discard signal.

15. The communications device of claim 14, wherein the input processor is operable to discard a cell if the number of cells in the buffer exceeds an overrun threshold.

16. The communications device of claim 15, wherein the buffer is a member of a buffer pool, the input processor is operable to discard a cell if the number of cells in the buffer pool exceeds a buffer pool limit.

17. The communications device of claim 16, wherein the input processor is operable to discard all cells corresponding to a frame associated with the cell exceeding the buffer pool limit.

18. The communications device of claim 10, wherein the input processor is operable to discard a cell if the number of cells in the buffer exceeds an overrun threshold.

19. The communications device of claim 10, wherein the buffer is a member of a buffer pool, the input processor is operable to discard a cell if the number of cells in the buffer pool exceeds a buffer pool limit.

* * * * *